United States Patent Office 3,598,738
Patented Aug. 10, 1971

3,598,738
OIL COMPOSITIONS CONTAINING ETHYLENE COPOLYMERS
Charles B. Biswell, Woodstown, N.J., Mark Stanley Fawcett, Chadds Ford, Pa., and Andrew Mitchell, Newark, Del., assignors to E. I. du Pont de Nemours and Company, Wilmington, Del.
No Drawing. Continuation-in-part of application Ser. No. 581,448, Sept. 23, 1966. This application Dec. 19, 1968, Ser. No. 785,329
Int. Cl. C01m 1/18
U.S. Cl. 252—59       7 Claims

ABSTRACT OF THE DISCLOSURE

This invention relates to mineral oil compositions comprising a neutral, non-volatile, mineral oil and an effective amount of a viscosity index improver selected from a limited class of oil-soluble, substantially linear, ethylene, hydrocarbon copolymers containing 25 to 55 weight percent polymerized ethylene units and having a pendent index of 18 to 33, an average pendent size not exceeding 10 carbon atoms, an average chain length of 2,700 to 8,800 carbon atoms and an inherent viscosity of 0.7 to 1.8 as measured on a 0.1 weight percent solution in tetrachloroethylene at 30° C.

CROSS-REFERENCES TO RELATED APPLICATIONS

This application is a continuation-in-part of application Ser. No. 581,448 filed Sept. 23, 1966, and now abandoned.

BACKGROUND OF THE INVENTION

It is well known that mineral lubricating oils and functional fluids have a tendency to become thin at elevated temperatures while becoming thick at low temperatures, and thus it is generally necessary to incorporate additives which improve their viscosity-temperature relationships. For example, in the case of a crankcase lubricating oil in a cold engine, it is desirable that the oil not become so thick that it is difficult to start the engine. On the other hand, when the engine is hot, it is necessary that the oil be sufficiently viscous that an oil film is maintained between the moving parts.

The viscosity-temperature relationship of an oil at temperatures in the range of 110° to 210° F. is known as its viscosity index. Thus, additives which retard the tendency of the oil to thin as the temperature is raised from 100° to 210° F. are known as viscosity index improvers. The viscosity index improvers which are most widely used at the present time are polymers of methacrylate esters having long alkyl chains and polyisobutylene polymers.

One of the most important considerations from a commercial standpoint in evaluating viscosity index improvers is the thickening power of the additive; that is, the amount of additive necessary to give the desired thickening at 210° F. Since these additives are considerably more expensive than the oil to which they are added, the amount of additive required has a significant effect upon the price of the resulting oil composition. The thickening power of polymeric viscosity index improvers generally increases with increased molecular weight.

One of the problems encountered with polymeric viscosity index improvers is their tendency to thicken mineral oils at low temperatures. In general, lower molecular weight polymers have a reduced tendency to thicken oils at low temperatures and in some cases may even improve their low-temperature properties.

Another problem frequently encountered with polymeric viscosity index improvers is their lack of shear stability. Shear stability is a measure of the tendency of the oil-polymer composition to become less viscous after prolonged use under high-shear conditions. This loss in the viscosity is believed to be due to a reduction in the molecular weight of the polymer. It is well known that low molecular weight polymers tend to be more shear stable than their higher molecular weight counterparts.

Thus the molecular weight of polymeric viscosity index improvers is generally a compromise between a high enough molecular weight to give good thickening power and a low enough molecular weight to give good shear stability and reduced tendency to increase the viscosity of the oil at low temperatures. There is a continuing need for viscosity index improvers which impart to mineral oils an improved combination of viscosity properties including viscosity index, thickening power, low temperature properties and shear stability.

DESCRIPTION OF THE INVENTION

It has now been discovered that certain copolymers of ethylene have outstanding overall properties as viscosity index improvers for mineral oils. The novel oil compositions of this invention comprise a neutral oil and, as viscosity index improver, an effective amount of an oil-soluble copolymer derived, by weight, about 25 to 55% from ethylene and about 75 to 45% from comonomer selected from the group consisting of terminally unsaturated straight chain monoolefins of 3 to 12 carbon atoms, ω-phenyl-1-alkenes of 9 to 10 carbon atoms, 2-norbornene, terminally unsaturated non-conjugated diolefins of 5 to 8 carbon atoms, dicyclopentadiene, 5-methylene-2-norbornene and mixtures thereof, said copolymer having a pendent index of about 18 to 33, an average pendent size not exceeding 10 carbon atoms and an average chain length of 2,700 to 8,800. The term "copolymer," as used herein, is intended to include polymers derived from two or more dissimilar monomers, for example, dipolymers, terpolymers, etc. The term "oil-soluble copolymer" is defined as a copolymer which remains dissolved in the neutral mineral oil base at ambient temperature after being dissolved in the mineral oil at 170 to 210° F.

The ethylene copolymers used as viscosity index improvers in accordance with this invention impart an outstanding combination of improved viscosity properties to neutral oils containing them. These copolymers have such remarkable thickening powers that they may be used in considerably smaller amounts than the most widely accepted viscosity index improvers in present commercial practice. At the same time, these polymers provide oil-polymer compositions having an overall combination of viscosity index, low temperature viscosity and shear stability properties which is superior to those provided by these same commercial viscosity index improvers.

The copolymers used in the present invention are oil soluble copolymers derived from ethylene and comonomers selected from the group consisting of terminally unsaturated straight chain monoolefins of 3 to 12 carbon atoms, φ-phenyl-1-alkenes of 9 to 10 carbon atoms, 2-norbornene, terminally unsaturated non-conjugated diolefins of 5 to 8 carbon atoms, dicyclopentadiene, 5-methylene-2-norbornene and mixtures thereof, that is, mixtures of the aforesaid types or subgroups, but no more than one comonomer from any single type or subgroup. Suitable terminally unsaturated straight chain monoolefins of 3 to 12 carbon atoms include propylene, 1-butene, 1-pentene, 1-hexene, 1-heptene, 1-octene, 1-nonene, 1-decene and 1-dodecene. Suitable ω-phenyl-1-alkenes of 9 to 10 carbon atoms are 3-phenyl-1-propene and 4-phenyl-1-butene. Suitable terminally unsaturated non-conjugated diolefins of 5 to 8 carbon atoms include 1,4-pentadiene, 1,4-hexadiene, 1,5-hexadiene, 2-methyl-1,5-hexadiene, 1,6-heptadiene and 1,7-octadiene.

In general, the copolymers used in accordance with this invention are derived about 25 to 55% by weight from ethylene, about 35 to 75% from propylene and up to 10% from 1,4-hexadiene. Preferably the copolymers are derived from about 40 to 55% from ethylene, about 40 to 59% from propylene and about 1 to 5% from 1,4-hexadiene. The most preferred copolymers are derived 50.5% from ethylene, 46% from propylene and 3.5% from 1,4-hexadiene.

The ethylene copolymers useful in the practice of this invention have a pendent index of about 18 to 33. The term "pendent index" is used to indicate the number of pendent groups, such as alkyl, alkenyl, cycloalkenyl and phenylalkyl, per 100 carbon atoms in the backbone of the polymer chain. When the pendent index is greater than about 33, poor shear stability may be encountered depending upon the average chain length. Preferably the pendent index is about 18–30. The term "pendent index" as used herein is similar in meaning to "branch index," the only difference being that the latter parameter is based on 100 carbon atoms of polymer whereas the former is based on 100 carbon atoms of backbone chain. Pendent index and branch index are determined by substantially the same, well-known standard analytical techniques, principally infra-red techniques wherein side chain methyl groups are quantitatively determined by comparison against a standard. For example, see U.S. Pat. 3,166,387 issued Jan. 19, 1965, British Pat. 993,744 published June 2, 1965, Analytical Chemistry 33, 215–217 (1961), and 35, 28–33 (1963). The average number of carbon atoms in a pendent group, i.e. the average pendent size, is determined readily from the comonomer employed since this number is the same as the number of carbon atoms in the group attached to the olefinic moiety of the comonomer. For example, if 1-dodecene is the sole comonomer, the number of carbon atoms in the pendent group, average pendent size, is ten.

The ethylene copolymers have an average pendent size not exceeding 10 carbon atoms. The term "average pendent size" is used to indicate the number of carbon atoms in an average size pendent group. Preferably the pendent size is about 1–6 carbon atoms.

The ethylene copolymers useful in the practice of this invention also have average chain lengths of about 2,700 to 8,800. The term "average chain length" is used to indicate the average number of carbon atoms in the backbone of the polymer chain as determined by light scattering. The average chain length is determined by subtracting from the total copolymer molecular weight the molecular weight of all the pendent groups, thus giving the molecular weight of the backbone, and dividing same by 14, the weight of a methylene backbone unit. It has been found that the average chain length correlates very well with the thickening power of the polymer. When the average chain length of the polymer goes below about 2,700, the thickening power of the polymer drops abruptly. At average chain lengths above about 9,000, the shear stabilities of resulting oil-polymer compositions are rather poor. Preferred chain lengths are 4,200 to 8,500.

These ethylene copolymers have inherent viscosities of about 0.7 to 1.8, measured as a 0.1% by weight solution of polymer in tetrachloroethylene at 30° C. The preferred copolymers have inherent viscosities of about 1.1 to 1.7. A definition of inherent viscosity is given in the Journal of Colloid Science, 1, 261–269 (1946). It is expressed as $$\ln Nr/c$$

wherein "$\ln$" is the natural logarithm "$Nr$" is the viscosity of the solution relative to the solvent and "$c$" is the concentration expressed in grams of solute/100 ml. of solvent. Inherent viscosity is indicative of the molecular weight of the polymer. Inherent viscosities of 0.7 to 1.8 correspond to about 45,000 to 140,000 weight average molecular weight, as determined by light scattering, while the preferred range of 1.1 to 1.7 corresponds to molecular weights of about 80,000 to 130,000.

Optimum performance is achieved with ethylene copolymers within the specified average chain length range which have a relatively narrow molecular weight distribution. Preferably the molecular weight distribution, which is determined by dividing the weight average molecular weight by the number average molecular weight, is less than about 8.

The copolymers which are used herein are the essentially amorphous, oil soluble, hydrocarbon copolymers of ethylene which are prepared by polymerization in the presence of coordination catalysts. Polymerization with these catalysts is well known, as described, for example, in U.S. Patents 2,799,668, 2,933,480 and 2,975,159. Since the utilization of these catalysts can produce a variety of polymers from ethylene and, for example, propylene, it is important to control the conditions of the reaction in order to obtain the requisite amorphous polymers having the specified molecular weights and narrow molecular weight distributions.

More specifically, in order to obtain the amorphous copolymers it is advantageous to use a hydrocarbon-soluble vanadium compound, for example, vanadium triacetylacetonate, in combination with an alkyl aluminum chloride as described in U.S. Pat. 3,300,459 and in J. Polymer Science, 51, 411 ff. and 429 ff. (1961). Use of this catalyst system results in the formation of an essentially amorphous copolymer which is soluble in a neutral mineral oil. Since such copolymers exhibit no substantial crystallinity as evidenced by X-ray examination, a more precise measure of the amorphous character of the polymer is the aforesaid solubility. The control of molecular weight and/or molecular weight distribution can be effected by the methods disclosed in J. Polymer Science, 34, 531 ff. (1959), for example, by the use of chain transfer agents such as metal alkyls, especially zinc alkyls, or in U.S. Pat. 3,051,690, for example, by the use of hydrogen.

As is well known, these catalysts must be used in strict absence of oxygen, water or other material with which they react. For this reason the solvents in which they are used are greatly limited, the preferred ones being the saturated aliphatic and hydroaromatic hydrocarbons and certain non-reactive halogen compounds such as tetrachloroethylene or a liquid chlorobenzene. These compounds conveniently serve as solvents for the polymerization which is usually carried out in a dilute suspension of the catalyst. The polymerization is normally carried out at ordinary temperatures and pressures. Although elevated temperatures and pressures are not required, the polymerization may be carried out under such conditions. Where found desirable, the polymerization may also be carried out at reduced temperatures and pressures. Polymerization conditions are preferably chosen to give a polymer having a narrow molecular weight distribution.

The neutral oil used as the base oil of the compositions of this invention may be a lubricating oil, such as the normally-used crankcase oils, or a functional fluid such as automotive transmission fluids, and hydraulic fluids. By "neutral oil" is meant a non-volatile mineral oil which has been refined to remove its acidic and alkaline content, generally by solvent extraction. Solvent extraction may also be used to reduce the paraffin or naphthene content of these oils. The mineral oil may be derived from paraffinic or naphthenic base petroleum, shale oil and the like.

Lubricating oil and transmission fluid base oils are predominantly paraffinic, solvent-refined neutral oils having Saybolt Universal Seconds (S.U.S.) viscosities of about 60 to 220 at 100° F. and viscosity indices of about 80 to 110. Lubricating oils preferably have S.U.S. viscosities of about 90 to 160, while transmission fluids preferably have S.U.S. viscosities of about 60 to 110. Hydraulic fluid base oils are predominantly naphthenic, solvent-refined neutral oils having S.U.S. viscosities not greater than about 50 and pour points not above about −65° F.

The ethylene copolymer may be incorporated into the base oil by first milling or blending the polymer into a small portion of mineral oil to form a concentrate, which is then blended into the base oil to the desired concentration. Suitable oils for forming the concentrate are paraffinic, naphthenic and mixed neutral oils of 70 to 150 S.U.S. viscosity at 100° F. which are commonly used as solvents or diluents for polymer concentrates. The solution time may be decreased by preheating the oil to 170° to 210° F. before milling or blending with the polymer. The polymer concentrate may conveniently contain about 5–15% by weight of polymer. The polymer may also be dissolved in the base oil by a solvent transfer technique, whereby the polymer is first dissolved in a volatile solvent, such as carbon tetrachloride, trichloroethylene or n-hexane. The solution is then mixed with the base oil and the solvent is removed by distillation.

The effective amount of ethylene copolymer used in the final oil composition is dependent upon the base oil viscosity. Generally it will be in the range of about 0.5 to 3% by weight and preferably about 1 to 2% by weight.

The oil compositions of this invention may also contain other types of additives usually compounded into neutral oil compositions, such as anti-oxidants, pour point depressants, basic detergents, corrosion inhibitors, rust inhibitors, extreme pressure additives and dyes. The ethylene copolymers used in accordance with this invention are generally compatible with these types of additives.

The following examples, illustrating the novel compositions disclosed herein, are given without any intention that the invention be limited thereto. Throughout these examples viscosities were measured in accordance with American Society for Testing Materials (ASTM) Test Method D 445. All percentages are by weight except where otherwise specified.

EXAMPLE 1

An ethylene/propylene/1.4-hexadiene terpolymer was prepared as follows:

Tetrachloroethylene solvent (500 ml.) was cooled to 0° C. in a flask equipped with a stirrer, gas delivery tube, thermometer and serum cap. The solvent was saturated with a mixture of ethylene, propylene, nitrogen and hydrogen gases at flow rates of 2.0, 1.5, 0.5 and 0.1 liter per minute respectively. Then 2.9 ml. (0.05 mole) of 1,4-hexadiene was added followed by 5 ml. of a 1.0 molar solution of diisobutylaluminum chloride in tetrachloroethylene and then 5 ml. of a 0.10 molar solution of vanadium trisacetylacetonate in benzene, each of these being introduced with a hypodermic syringe. The mixture was stirred at 0.° C. for 20 minutes and then the catalyst was destroyed by adding 10 ml. of a 1% solution of 4,4′-butylidene-bis-(6-tert.butyl-3-methyl phenol) in isopropanol. The reaction mixture was extracted with an equal volume of 5% hydrochloric acid in a high speed mixer and washed with two 500 ml. portions of water. The solvent was allowed to evaporate in an open pan and the polymer residue was vacuum dried for 24 hours at 75° C. and 20 mm. Hg pressure. The yield was 25 g. of ethylene/propylene/1,4-hexadiene terpolymer.

The composition of the terpolymer was determined as follows: The propylene content was found to be 45.1% by comparison of the 8.67 to 2.35 micron infrared absorbance ratio with a calibration curve which related this ratio to the propylene content. This calibration curve was established using radioactive-carbon tagged polymers. The bromine equivalent showed the polymer contained 2.6% unsaturated hexadiene. Applying the 10.36 to 2.35 and 8.67 to 2.34 micron infrared absorbance ratios to a calibration equation gave a total hexadiene content of 3.9%. The inherent viscosity of the terpolymer, measured as a 0.1% solution in tetrachloroethylene at 30° C., was 1.26.

The additional copolymers listed in Tables I and II below were prepared and analyzed in a similar manner.

Additive concentrates of these copolymers were prepared as follows: Twelve gallons (90 lbs.) of a paraffinic, solvent-refined neutral oil of 73 S.U.S. viscosity and a viscosity index of 100 were charged into a 25 gallon capacity Duolater milling apparatus at room temperature. Twelve pounds of copolymer, cut into one-inch cubes, were added. The mixture was milled for about 30 minutes, after which a clear solution resulted, and then for 10 additional minutes.

The following tests were carried out using additive concentrates of the ethylene copolymers listed in Tables I and II.

Thickening power

The thickening powers of various ethylene copolymers were determined by measuring the viscosity in centistokes at 100° F. of oil compositions containing a solvent-refined neutral oil having a S.U.S. viscosity of 220 at 100° F. and a viscosity index of 98 as the base oil and sufficient viscosity index improver concentrate to provide a copolymer concentration of 3%. For comparison, a commercial polyisobutylene polymer, designated "Commercial Polymer A," and a commercial polymethacrylate polymer, designated "Commercial Polymer B," the most widely used commercial viscosity index improvers, were also tested.

Viscosity index

Viscosity index was determined in accordance with ASTM Test Method D 567 by measuring the viscosity at 100° F. of oil compositions containing as the base oil a solvent-refined neutral oil having a S.U.S. viscosity of 107 at 100° F. and a viscosity index of 96, a solvent-refined neutral oil having a S.U.S. viscosity of 130 at 100° F. and a viscosity index of 97 or a blend of the two, and the amount of various ethylene copolymers necessary to give the oil composition a viscosity of 11.5±0.1 centistokes at 210° F. Viscosity index was not affected by the variation in viscosity of the base oil since in all cases the base oil had a viscosity index of 96 to 97. Higher viscosity indices indicate reduced temperature sensitivity of the oil composition.

Weight for equal thickening

Weight for equal thickening was determined by measuring the amount of various ethylene copolymers necessary to increase the viscosity of the same base oil as used in the viscosity index determination to 11.5±0.1 centistokes at 210° F. This amount was then compared with the amount of Commercial Polymer A necessary to accomplish the same result with the same base oil in each case. The amount of Commercial Polymer A was arbitrarily assigned a value of one and the amount of ethlene copolymer was expressed as a fraction thereof.

Viscosity at 0° F.

The apparent viscosities at 0° F. of oil compositions containing the same base oil as in the viscosity index test and the amount of various ethylene copolymers necessary to give the oil composition a viscosity of 11.5±0.1 centistakes at 210° F. were measured using a cold cranking simulator. In this test, a universal motor, run at constant voltage, drives a rotor which is closely fitted inside a stator. A small sample of the oil composition fills the space between the rotor and stator which are maintained at 0° F. The speed of the rotor is a function of, and is calibrated to determine, the viscosity of the oil composition in poises. Comparisons with Commercial Polymers A and B were run using the same base oils.

Shear stability

The shear stabilities of oil compositions containing the same base oil as in the viscosity index test and the amount of various ethylene copolymers necessary to increase the viscosity of the oil composition to 11.5±0.1 centistokes at 210° F. were determined using a 250-w., 10-kc. magnetostrictive sonic oscillator in accordance with the technique described in "Proposed Method of Test for Shear Stability of Polymer-Containing Oils," in ASTM Standards, Vol. I, page 1160 (October 1961). The procedure was modified by shearing a 50 ml. sample for 60 minutes at 100° F. at 0.6 R.F. amps. Shear stability is expressed as the average percent retention of viscosity in centistokes at 210° F. and 100° F. Comparisons with Commercial Polymers A and B were run using the same base oils.

Tables I and II show the improved viscosity properties and the surprising shear stabilities of the ethylene copolymer-containing lubricant compositions of this invention. For comparison, data for oil compositions containing Commercial Polymer A and Commercial Polymer B are given in Table III.

of 11.5+0.1 centistokes at 210° F., 4% polyaminomonoalkenylsuccinimide, designated Additive X, 1% zinc dialkyldithiophosphae, designated Additive Y, and 2% basic calcium sulfonate, designated Additive 2. The base oil was a blend of refinery components having a S.U.S. viscosity of 107 at 100° F. and a viscosity index of 97 and containing 20 to 25% by volume aromatics, 10 to 20% by volume olefins, 55 to 65% by volume saturates, 0.21 to 0.25% by weight sulfur and 2.5 to 3 ml. tetraethyl lead per million gallons. The lubricant compositions were tested in a single-cylinder CLR engine operated for 180 hours to determine in-use performance of the polymers and their compatibility with the other additives. The used lubricant compositions were periodical-

TABLE I.—ETHYLENE/PROPYLENE/1,4-HEXADIENE COPOLYMERS

| Copolymer Weight ratio | Average chain length | Thickening power | Base oil visc., S.U.S. at 100° F. | Viscosity index | Wt. for equal thickening | Visc. at 0° F., poises | Shear stability, percent |
|---|---|---|---|---|---|---|---|
| 41.8/54.7/3.5 | 6,700 | | 107 | 140 | 0.52 | 11.5 | 81 |
| 53.1/40.8/6.1 | 6,000 | | 107 | 139 | 0.60 | 10.5 | 85 |
| 50.7/46.8/2.5 | 6,000 | | 107 | 142 | 0.56 | | 85 |
| 54.3/44/1.7 | 6,000 | | 107 | 144 | 0.56 | 6.0 | 85 |
| 55.3/41.0/3.7 | 5,600 | 268 | | | | | |
| 50.1/46.1/3.8 | 5,500 | | 110 | 135 | 0.56 | 10.2 | 84 |
| 51/45.1/3.9 | 5,500 | | 107 | 144 | 0.62 | 9.6 | 86 |
| 1.8/45/3.2 | 5,200 | 260 | | | | | |
| 29.3/67.7/3 | 5,000 | | 107 | 135 | 0.69 | 9.6 | 85 |
| 42.5/54.4/3.1 | 4,900 | | 107 | 135 | 0.69 | 15.8 | 86 |

TABLE II.—ETHYLENE COPOLYMERS

| Copolymer Weight ratio | Average chain length | Base oil visc., S.U.S. at 100° F. | Viscosity index | Wt. for equal thickening | Visc. at 0° F., poises | Shear stability, percent |
|---|---|---|---|---|---|---|
| Ethylene/propylene: | | | | | | |
| 42/58 | 7,100 | 107 | 140 | 0.48 | 10.2 | 73 |
| 33/67 | 6,900 | 107 | 140 | 0.62 | 11.6 | 83 |
| 44/56 | 5,500 | 107 | 143 | 0.59 | 10.4 | 84 |
| 27/73 | 5,400 | 107 | 141 | 0.64 | | 82 |
| Ethylene/hexene: 32/68 | 3,200 | 107 | 143 | 0.72 | | 81 |

TABLE III.—COMPARATIVE DATA

| Commercial polymer | Thickening power | Base oil visc., S.U.S. at 100° F. | Viscosity index | Wt. for equal thickening | Visc. at 0° F., poises | Shear stability, percent |
|---|---|---|---|---|---|---|
| A | 142 | 107 | 138 | 1.00 | 14.1 | 77 |
| A | 142 | 110 | 138 | 1.00 | 14.1 | 77 |
| A | 142 | 122 | 138 | 1.00 | 14.3 | 77 |
| A | 142 | 126 | 138 | 1.00 | 14.4 | 77 |
| A | 142 | 131 | 138 | 1.00 | 14.5 | 77 |
| B | 157 | 131 | 157 | 1.03 | 10.7 | 62 |

EXAMPLE 2

The in-use performance and compatibility of several ethylene copolymers prepared and analyzed as indicated in Example 1 were determined as follows:

Lubricant compositions were prepared containing a base oil, an amount of various polymer concentrates, prepared as in Example 1, necessary to give a viscosity ly removed from the engine, topped to remove gasoline dilution, centrifuged to settle out any insoluble matter, and analyzed to determine viscosities at 210° and 100° F.

The following table shows the changes in viscosity of compounded oils containing an ethylene copolymer compared with the same compounded oils containing Commercial Polymer A.

TABLE IV.—PERFORMANCE AND COMPATIBILITY TEST

| Weight ratio | Average chain length | Other additives | Temp. (° F.) | Viscosity, centistokes Hours | | | |
|---|---|---|---|---|---|---|---|
| | | | | 0 | 60 | 120 | 180 |
| Copolymer: | | | | | | | |
| Ethylene/propylene/hexadiene: 51.8/45/3.2 | 5,200 | X+Y | 100 | 71.9 | 64.9 | 72.3 | 78.7 |
| | | X+Y | 210 | 11.5 | 10.2 | 10.7 | 11.5 |
| | | X+Y+Z | 100 | 72.6 | 67.3 | 72.7 | 108.5 |
| | | X+Y+Z | 210 | 11.6 | 10.7 | 11.4 | 18.2 |
| Commercial polymer A | | X+Y | 100 | 69.2 | 61.5 | 89.6 | 144.3 |
| | | X+Y | 210 | 11.4 | 9.7 | 12.1 | 20.1 |
| | | X+Y+Z | 100 | 71.3 | 65.5 | 117.4 | 194.9 |
| | | X+Y+Z | 210 | 11.6 | 10.5 | 20.2 | 25.9 |

From the foregoing table it can be seen that the viscosity of the compounded oils containing Commercial Polymer A are thickened considerably after 180 hours, while the compounded oils containing the ethylene copolymer do not exhibit any appreciable thickening. Viscosity increases during prolonged use are generally attributed to oxidation of the oils, producing reactive intermediates. The fact that oils containing the ethylene copolymers do not thicken may be explained by the greater shear stability and thickening power of the copolymers, whereby polymer fragments are not produced which could otherwise react with the reactive oxidation intermediates to form polymer adducts with accompanying viscosity increases.

Thus, it has been shown that the novel oil compositions of this invention have an outstanding combination of shear stability and viscosity improvement, even when used in exceedingly small amounts, and at low temperatures, and they minimize oil thickening during prolonged use.

As will be apparent to those skilled in the art, numerous modifications and variations in the amount and composition of the ethylene copolymer and base oil may be made without departing from the spirit of the invention or the scope of the following claims.

The embodiments of the invention in which an exclusive property or privilege is claimed are defined as follows:

1. An oil composition which comprises a neutral mineral oil base and, as viscosity index improver, an effective amount of an essentially amorphous, oil-soluble copolymer derived, by weight, 25 to 55% from ethylene and 75 to 45% from a comonomer selected from the group consisting of (a) terminally unsaturated straight chain monoolefins of 3 to 12 carbon atoms,
(b) ω-phenyl-1-alkenes of 9 to 10 carbon atoms,
(c) 2-norbornene,
(d) terminally unsaturated non-conjugated diolefins of 5 to 8 carbon atoms,
(e) dicyclopentadiene, and
(f) 5-ethylene-2-norbornene and mixtures thereof, but no more than one comonomer from any single subgroup, said copolymer having a pendent index of 18 to 33, an average pendent size not exceeding 10 carbon atoms, an average chain length of 2,700 to 8,800 carbon atoms, an inherent viscosity of 0.7 to 1.8 as measured on a 0.1 weight percent solution in tetrachloroethylene at 30° C. and a molecular weight distribution of less than 8.

2. The oil composition of claim 1 which contains 0.5 to 3% of copolymer which is derived 25 to 55% from ethylene, 35 to 75% from propylene and up to 10% from 1,4-hexadiene, and has a pendent index of 18 to 30, an average pendent size of 1 to 6 carbon atoms, an average chain length of 4,200 to 8,500 carbon, an inherent viscosity of 1.1 to 1.7.

3. The oil composition of claim 2 which contains 1 to 2% of copolymer derived 50.5% from ethylene, 46% from propylene and 3.5% from 1,4-hexadiene.

4. The oil composition of claim 1 which contains 5 to 15% of copolymer.

5. The oil composition of claim 1 in which the neutral oil is a preponderantly paraffinic, solvent-refined petroleum oil having an S.U.S. viscosity of 60 to 220 at 100° F. and a viscosity index of 80 to 110 or a preponderantly naphthenic, solvent-refined petroleum hydraulic fluid having an S.U.S. viscosity not greater than 50 at 100° F. and a pour point not above −65° F.

6. The oil composition of claim 5 in which the neutral oil is a lubricating oil having a S.U.S. viscosity of 90 to 160 at 100° F.

7. The oil composition of claim 5 in which the neutral oil is a transmission fluid having a S.U.S. viscosity of 60 to 110 at 100° F.

References Cited

UNITED STATES PATENTS

| | | | |
|---|---|---|---|
| 3,222,332 | 12/1965 | Duck et al. | 260—80.5 |
| 2,616,854 | 11/1952 | Fenske | 252—73X |
| 2,825,721 | 3/1958 | Hogan et al. | 252—59X |
| 2,992,987 | 7/1961 | Fields | 252—56 |
| 3,112,297 | 11/1963 | Gordon et al. | 252—59X |
| 3,265,622 | 8/1966 | Anderson | 252—59 |
| 3,336,121 | 8/1967 | Jacobson et al. | 252—59X |
| 3,341,503 | 9/1967 | Paige et al. | 252—59X |
| 3,389,087 | 6/1968 | Kresge et al. | 252—59 |

PATRICK P. GARVIN, Primary Examiner

W. H. CANNON, Assistant Examiner

U.S. Cl. X.R.

252—73; 260—94.2, 94.9